United States Patent
Brown et al.

(10) Patent No.: US 9,147,006 B2
(45) Date of Patent: Sep. 29, 2015

(54) REQUESTING COMPUTER DATA ASSETS (75) Inventors: Martin Brown, Hampshire (GB); Timothy Peter Griffith, Hampshire (GB); Anthony Philip Papageorgiou, Hampshire (GB); Gavin Peter Willingham, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/142,190

(22) PCT Filed: Feb. 23, 2010

(86) PCT No.: PCT/EP2010/052255
§ 371 (c)(1),
(2), (4) Date: Jun. 22, 2012

(87) PCT Pub. No.: WO2010/149398
PCT Pub. Date: Dec. 29, 2010

(65) Prior Publication Data
US 2012/0284346 A1  Nov. 8, 2012

(30) Foreign Application Priority Data
Jun. 24, 2009 (EP) .................................. 09163658

(51) Int. Cl.
G06F 15/16 (2006.01)
G06F 17/30 (2006.01)
H04L 29/08 (2006.01)

(52) U.S. Cl.
CPC .......... *G06F 17/30899* (2013.01); *H04L 67/36* (2013.01); *H04L 67/02* (2013.01)

(58) Field of Classification Search
USPC ......... 709/201–226, 200; 707/3–10, 100–120
See application file for complete search history.

(56) References Cited

U.S. PATENT DOCUMENTS 5,778,372 A * 7/1998 Cordell et al. ........................ 1/1
5,987,466 A   11/1999 Greer et al.
(Continued)

FOREIGN PATENT DOCUMENTS

CN   101211363 A   7/2008
EP   1307021      5/2003
(Continued)

OTHER PUBLICATIONS

Andrew Hankinson, Laurent Pugin, Gabriella Hartle Knaus, Ichoro Fujinaga: "A Web-Based Musical Document Viewer for Digital Music Libraries" McGill University; Sep. 18, 2008, XP002576439.
(Continued)

*Primary Examiner* — El Hadji Sall
(74) *Attorney, Agent, or Firm* — Jordan IP Law, LLC (57) ABSTRACT

A computer management apparatus, method and computer program operable for displaying a data file on a client computer, wherein the data file comprises a structure file and a first plurality of data elements, the apparatus comprising: a send component operable for sending a first message comprising a request for the structure file; a receive component operable for receiving the structure file; an evaluate component operable for determining a second plurality of data elements, wherein the second plurality of data elements is associated with a visible area; a send component further operable for sending a second message, wherein the second message comprises a request for the second plurality of data elements; a receive component further operable for receiving the second plurality of data elements; and a display component, responsive to receipt of the second plurality of data elements, operable for displaying the second plurality of data elements in the visible area.

18 Claims, 7 Drawing Sheets

(56) References Cited

U.S. PATENT DOCUMENTS

| | | |
|---|---|---|
| 7,107,506 B2 | 9/2006 | Reichenbach |
| 7,738,688 B2 | 6/2010 | Eichhorn et al. |
| 8,022,970 B2 | 9/2011 | Odagawa |
| 8,582,849 B2 | 11/2013 | Eichhorn et al. |
| 2002/0194434 A1 | 12/2002 | Kurasugi |
| 2003/0158916 A1 | 8/2003 | Cronin |
| 2004/0167806 A1 | 8/2004 | Eichhorn et al. |
| 2005/0108636 A1 | 5/2005 | Sylthe et al. |
| 2006/0082600 A1 | 4/2006 | Odagawa |
| 2007/0143277 A1 | 6/2007 | VanDeLaar et al. |
| 2007/0180509 A1* | 8/2007 | Swartz et al. .......... 726/9 |
| 2007/0186182 A1 | 8/2007 | Schiller |
| 2008/0215966 A1 | 9/2008 | Suarez |
| 2010/0260407 A1 | 10/2010 | Eichhorn et al. |
| 2012/0002892 A1 | 1/2012 | Eichhorn et al. |
| 2014/0068442 A1 | 3/2014 | Eichhorn et al. |

FOREIGN PATENT DOCUMENTS

| | | |
|---|---|---|
| JP | H11-174952 A | 7/1999 |
| JP | 2002-373109 A | 12/2002 |
| JP | 2003-091450 A | 3/2003 |
| JP | 2004-265020 A | 9/2004 |
| JP | 2006-113801 A | 4/2006 |
| JP | 2006-519443 A | 8/2006 |
| JP | 2007-235961 A | 9/2007 |
| JP | 2007-243552 A | 9/2007 |
| JP | 2009-521020 A | 5/2009 |
| KR | 20080093183 | 10/2008 |
| WO | WO02/46946 | 6/2002 |

OTHER PUBLICATIONS

Greg R Notess: "New Google Book Viewer"; searchenginesshowdown.com; Nov. 21, 2006, XP002576440.

* cited by examiner

REQUESTING COMPUTER DATA ASSETS

TECHNICAL FIELD

The invention relates to the field of computer data delivery. In particular, the invention relates to an apparatus, method and computer program product for requesting downloadable computer data elements.

BACKGROUND OF THE INVENTION

Increases in computer network connection speeds and bandwidth allow data processing systems to offer richer data content. Web sites use increasing Internet connection speeds to provide richer and higher bandwidth content. Computer data content in the form of Internet data elements, such as pictures and videos, are commonly used in web pages to serve the purpose of increasing the users' experience. Web data elements are also being used increasingly in email communications. However, the improvement in data content delivery may also be detrimental to users, as bandwidth improvements come at a cost. Accessing the Internet via mobile phones is a particular area that suffers from high cost and low performance connections. Often users are charged by the number of Megabytes downloaded. Since the average web page is steadily growing in size, users of such types of connections are finding that downloads are taking longer and are more expensive than previously.

A current client-side solution to reduce the cost of viewing any web page is the option to not download pictures or videos. Many web browsers support this but since so many websites rely on images to construct menus for navigation the user finds that a lot of websites become unusable. Intimately the user has lost value from the experience of using the site.

Additionally, some web sites and web based applications provide a mechanism by which the client only retrieves data for the visible portion of the page. Although this behaviour is very helpful to the user of a high cost connection, it has to be implemented on a per application basis. Since most website providers do not code such behaviour into their sites and most users would not choose to limit their browsing to the sites that have had it implemented, this solution does little to reduce the overall cost of using the connection and serves mainly to increase the performance of web site into which it has been implemented.

Therefore, there is a need in the art to address the aforementioned problem.

SUMMARY OF INVENTION

Viewed from a first aspect, the present invention provides a computer management apparatus for displaying a data file on a client computer, wherein the client computer comprises a visible area, wherein the data file comprises a structure file and a first plurality of data elements, and wherein the first plurality of data dements comprises a second plurality of data elements, the apparatus comprising: a send component operable for sending a first message to a server, wherein the message comprises a request for a structure file, wherein the structure file comprises a list of the first plurality of data elements; a receive component operable for receiving the structure file from the server; an evaluate component, responsive to receipt of the structure file, operable for determining the second plurality of data elements, wherein the second plurality of data elements is associated with the visible area; the send component further operable for sending a second message to the server, wherein the second message comprises a request for the second plurality of data elements; the receive component further operable for receiving the second plurality of data elements; and a display component, responsive to receipt of the second plurality of data elements, operable for displaying the second plurality of data elements in the visible area.

This has the advantage that only data elements that are used need to be downloaded and paid for, without the user having missed any information of value from the page.

Preferably, the present invention provides an apparatus wherein the apparatus further comprises: a store component, responsive to receipt of the second plurality of data elements, operable for storing the second plurality of data elements in a client computer store.

Preferably, wherein the second plurality of data elements comprises a third plurality of data elements, the present invention provides an apparatus wherein the apparatus further comprises: the evaluate component, responsive to receipt of the structure file, further operable for evaluating the list of the first plurality of data elements for determining the third plurality of data elements, wherein the third plurality of data elements is not stored in the client computer store; the send component further operable for sending a third message to the server, wherein the third message comprises a request for the third plurality of data elements; the receive component further operable for receiving the third plurality of data elements; the store component, responsive to receipt of the third plurality of data elements, further operable for storing the third plurality of data elements in the client computer store; and the display component, responsive to receipt of the third plurality of data elements, further operable for displaying the second plurality of data elements in the visible area.

Advantageously, the present invention provides for data elements to be stored in the apparatus, so that the data elements do not need to be downloaded repeatedly, thereby saving cost.

Preferably, wherein the client computer further comprises a pre-fetch area, the present invention provides an apparatus wherein the apparatus further comprises: the evaluate component, responsive to receipt of the structure file, further operable for evaluating the list of the first plurality of data elements for determining a fourth plurality of data elements, wherein the fourth plurality of data elements is associated with the pre-fetch area, and wherein the fourth plurality of data elements is not stored in the client computer store; the send component further operable for sending a fourth message to the sever, wherein the fourth message comprises a request for the fourth plurality of data elements; the receive component further operable for receiving the fourth plurality of data elements; and the store component, responsive to receipt of the fourth plurality of data elements, further operable for storing the fourth plurality of data elements in the client computer store. Advantageously, the present invention provides for data elements associated with a border around the visible area to be downloaded before being needed, so that if the user moves the visible area of the page, then these data elements need not be downloaded, thereby improving performance.

Preferably, the present invention provides an apparatus wherein the client application is a web browser. Alternatively, the present invention provides an apparatus wherein the client application is an email client. Advantageously, the present invention provides for the apparatus to be applicable to web page accesses or for viewing email content.

Viewed from a second aspect, preferably, the present invention provides a method for displaying a data file on a client computer, wherein the client computer comprises a visible area, wherein the data file comprises a structure file and a first plurality of data elements, and wherein the first plurality of data elements comprises a second plurality of data elements, the method comprising the steps of: sending a first message to a server, wherein the message comprises a request for a structure file, wherein the structure file comprises a list of the first plurality of data elements; receiving the structure file from the server; responsive to receipt of the structure file, determining the second plurality of data elements, wherein the second plurality of data elements is associated with the visible area; sending a second message to the server, wherein the second message comprises a request for the second plurality of data elements; receiving the second plurality of data elements; and responsive to receipt of the second plurality of data elements, displaying the second plurality of data elements in the visible area.

Preferably, the present invention provides a method, wherein the method further comprises the steps of: responsive to receipt of the second plurality of data elements, storing the second plurality of data elements in a client computer store.

Preferably, wherein the second plurality of data elements comprises a third plurality of data elements, the present invention provides a method wherein the method further comprises the steps of: responsive to receipt of the structure file, evaluating the list of the first plurality of data elements for determining the third plurality of data elements, wherein the third plurality of data elements is not stored in the client computer store; sending a third message to the server, wherein the third message comprises a request for the third plurality of data elements; receiving the third plurality of data elements; responsive to receipt of the third plurality of data elements, storing the third plurality of data elements in the client computer store; and responsive to receipt of the third plurality of data elements, displaying the second plurality of data elements in the visible area.

Preferably, wherein the client computer further comprises a pre-fetch area, the present invention provides a method wherein the method further comprises the steps of responsive to receipt of the structure file, evaluating the list of the first plurality of data elements for determining a fourth plurality of data elements, wherein the fourth plurality of data elements is associated with the pre-fetch area, and wherein the fourth plurality of data elements is not stored in the client computer store; sending a fourth message to the server, wherein the fourth message comprises a request for the fourth plurality of data elements; receiving the fourth plurality of data elements; and responsive to receipt of the fourth plurality of data elements, storing the fourth plurality a data elements in the client computer store.

Preferably, the present invention provides a method, wherein the client application is a web browser.

Alternatively, the present invention provides a method, wherein the client application is an email client.

Viewed from a third aspect, the present invention provides a computer program product loadable into the internal memory of a digital computer, comprising software code portions for performing, when said product is run on a computer, to carry out the invention.

BRIEF DESCRIPTION OF THE DRAWINGS

The present invention will now be described, by way of example only, with reference to preferred embodiments, as illustrated in the following figures.

DETAILED DESCRIPTION OF THE INVENTION

In a preferred embodiment of the invention, an apparatus, method and computer program product are provided that request computer data elements (for example, static graphics, videos or even text) from a server as and when they are needed. For example, a web data element is requested when a web browser displays the web data element. Therefore, for example, a data element at the bottom of a web page will not be requested until the user scrolls down to view it. For older websites this may be restricted to pictures only, as text is often included within the HTML. However, modern sites have moved away from this model and today's best practice is to use the HTML to define the structure of the page and subsequently populate that structure with text, usually requested through asynchronous JavaScript and XML (AJAX) web development techniques.

For example, a weblog (blog) may contain many entries, including text and graphics. When the page loads, prior art web browsers load the structure of the page, followed by the text for every entry on the page. For a long blog page this may be a large amount of information. If the user only wants to read the entry at the top of the page, payment will have to be made for the whole download, including many entries that are never viewed.

In a preferred embodiment of the invention, the web browser in a client computer loads the structure of the page first and only send requests for the visible unacquired data elements. Therefore, in the blog example above, the web browser would only request data elements for the first entry of the blog since this is initially the only visible portion of the page. If the user leaves the page they have only paid for the information they have used.

Figure 1:
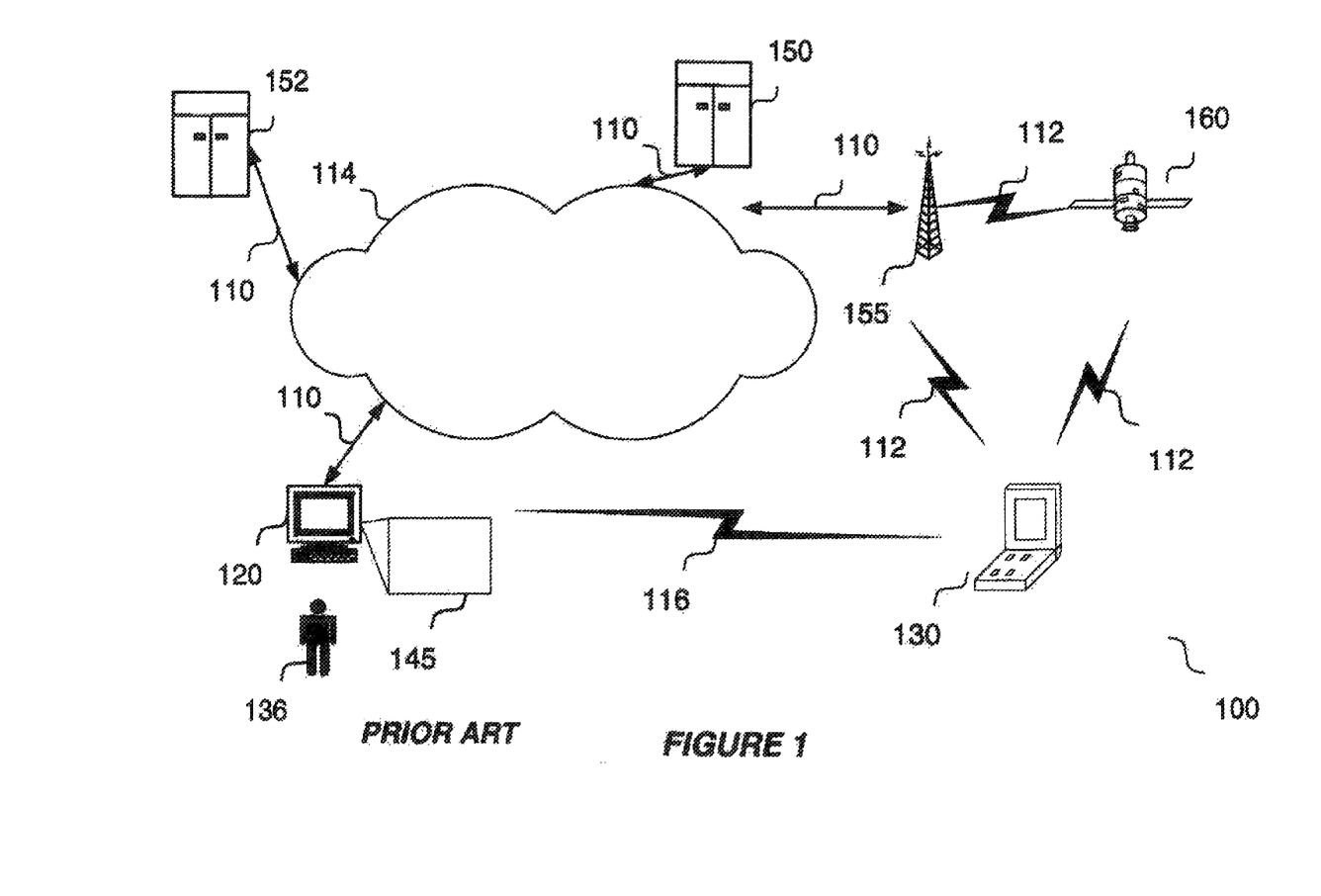
FIG. 1 is a block diagram depicting a data processing system, in accordance with the prior art, and in which a preferred embodiment of the present invention may be implemented.

FIG. 1 is a block diagram depicting a data processing system 100, in accordance with the prior art, and in which a preferred embodiment of the present invention may be implemented. An example of a data processing system 100 is the Internet. A client application 145 is operable by a user 136 on a data processing system 100 that comprises a workstation 120, a mobile phone 130, and servers 150 and 152. The workstation 120, the mobile phone 130, and servers 150, 152 are connectable through a network 114, which may comprise wired networks 110, or wireless networks 112. The mobile phone 130 may be connectable to the servers 150, 152 through the network 114 through a radio mask 155 or a satellite 160. Workstations 120 and mobile phones 130 may also be connectable through a peer-to-peer (P2P) connection 116, which may be wired or wireless.

A client application 145 is operable on a client computer, such as the workstation 120 or mobile phone 130 in communication with a server application (not depicted) operable on the server 150. Only the client application 145 on the workstation 120 is depicted. Typically, a name server 152 is also connectable to the network 114. A name server 152 translates a URL into an Internet Protocol (IP) address. An example of a client application 145 is a web browser 145 interacting with the Internet. User A 136 accesses the Internet by interacting with a client application 145 operable on a workstation 120 or mobile phone 125. As is well known in the art, the client computer comprises one or more processors and one or more memories operably connected with the one or more processors. The client application 145 (e.g. web browser) is encoded on the one or more memories and executed by the processor.

Another example of a client application 145 is an email client 145 operable on the workstation 120 in communication with an email server (not depicted) operable on the server 150, and with other email clients 145 operable on other workstations 120 or mobile phones 130. Increasingly, email messages comprise Internet technologies such as HTML content, as well as plain text.

User A 136 accesses the email system by interacting with an email client 145 operable on a workstation 120 or mobile phone 125.

By way of example, to illustrate a preferred embodiment of the invention, the client application 145 is described as a web browser 145 accessing a web page from the Internet. However, the invention is also applicable to email clients requesting access to email resources comprising Internet technologies. Typically, User A 136 enters the address of a web page, in the form of a Uniform Resource Locator (URL), into the address field of the web browser 145 operable on a workstation 120, or a mobile phone 130. The content of the web page is returned to the web browser 145 from the Internet, and displayed in the available visible area on the screen of the workstation 120 or the mobile phone 130. The web browser 145 displays a subset of the web page, depending on the screen settings of the workstation 120 or the mobile phone 130.

Figure 2:
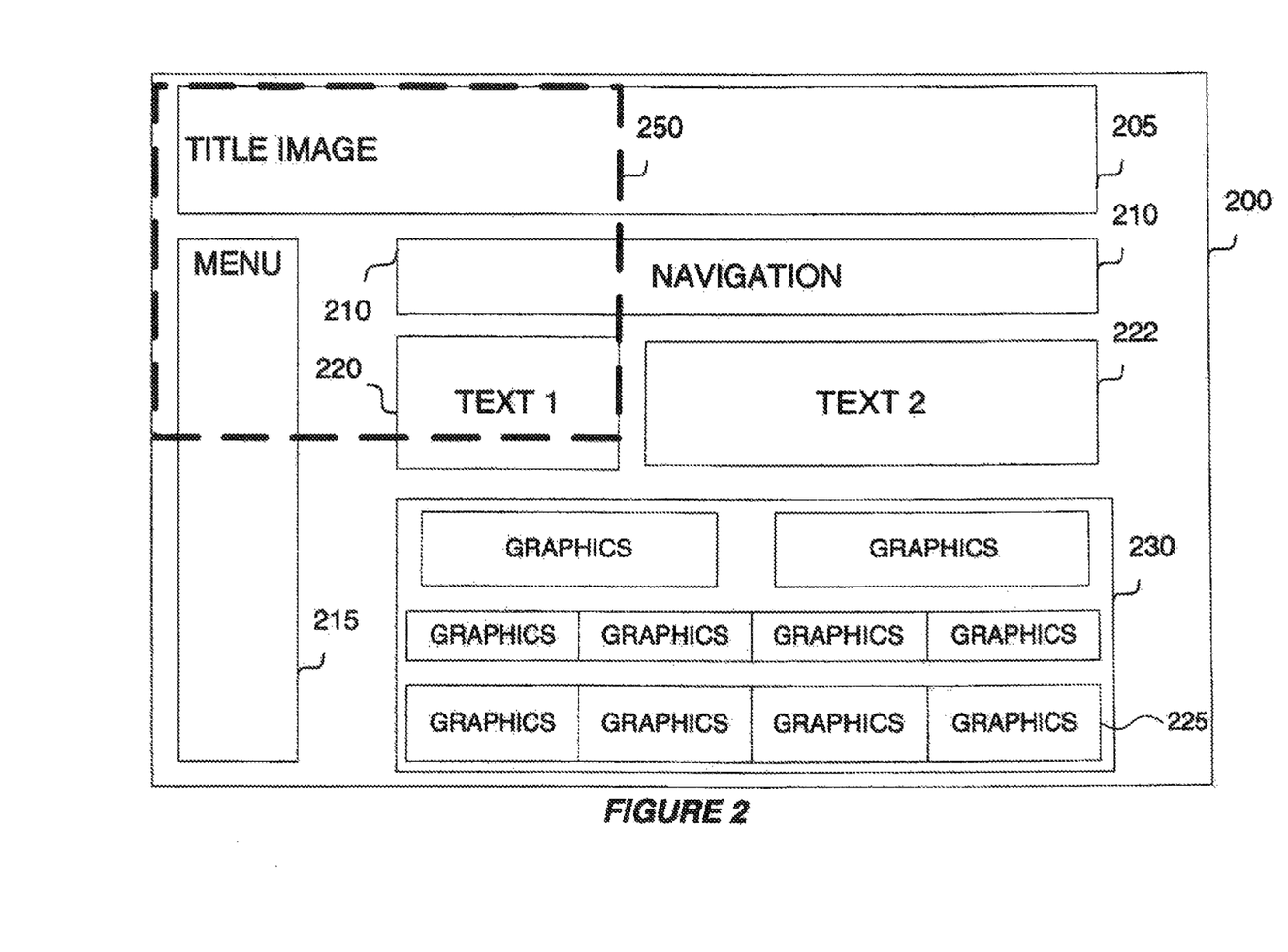
FIG. 2 depicts the structure of an exemplary web page, comprising a plurality of fields in accordance with a preferred embodiment of the present invention.

FIG. 2 depicts the structure of an exemplary web page 200, comprising a plurality of fields 205, 210, 215, 220, 222, 225, 230 in accordance with a preferred embodiment of the present invention. A title image field 205 comprising text and graphics is depicted at the top of the web page 200. A menu field 215 comprises menu information of text and hyper links to other fields 220, 222, 225 in the web page 200, as well as to further web pages. A navigation field 210 comprises navigation tabs to other fields 220, 222, 225 in the web page 200. Text fields 220 and 222 comprise web page text. A graphics area 230 comprises graphics fields 225. FIG. 2 also depicts a first location 250 that represents a visible area of the web page 200 when viewed on a workstation 120.

Figure 3:
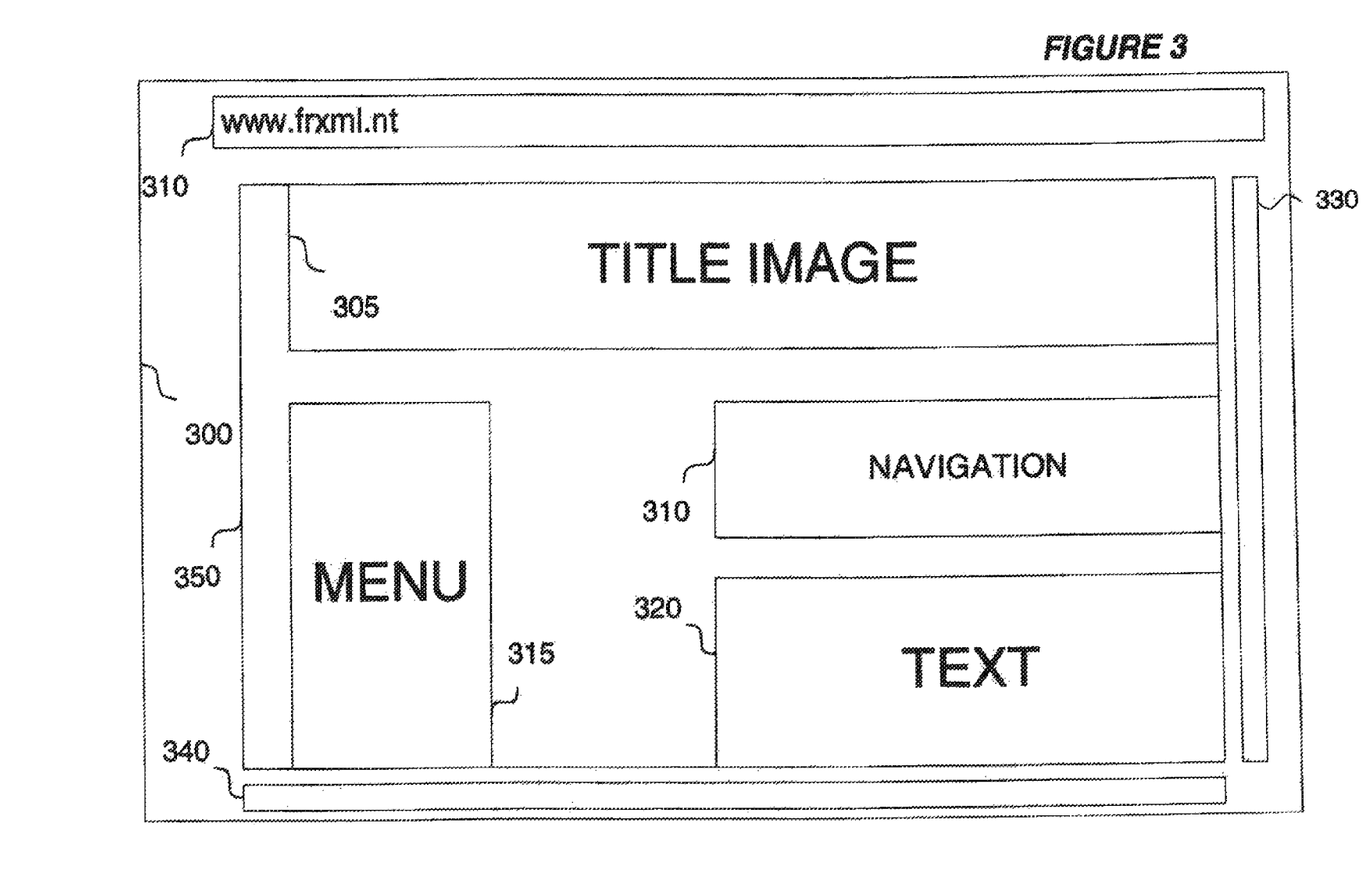
FIG. 3 depicts an exemplary web browser window, in accordance with a preferred embodiment of the present invention.

FIG. 3 depicts an exemplary web browser window 300, in accordance with a preferred embodiment of the present invention. The web browser window 300 comprises the visible area 350 of the exemplary web page 200 of FIG. 2 relating to the first location 250. The web browser window 300 also comprises an address field 310, into which a user 136 types a URL. As an example, a URL of "www.frxml.nt" is depicted. The visible portions 305, 310, 315, 320 of the title image field 205, navigation field 210, menu field 215, and one text field 220 are also depicted. Typically, if a web page comprises areas that are not visible, a vertical slider bar 330 and horizontal slider bar 340, are provided in the browser window 300.

Figure 4:
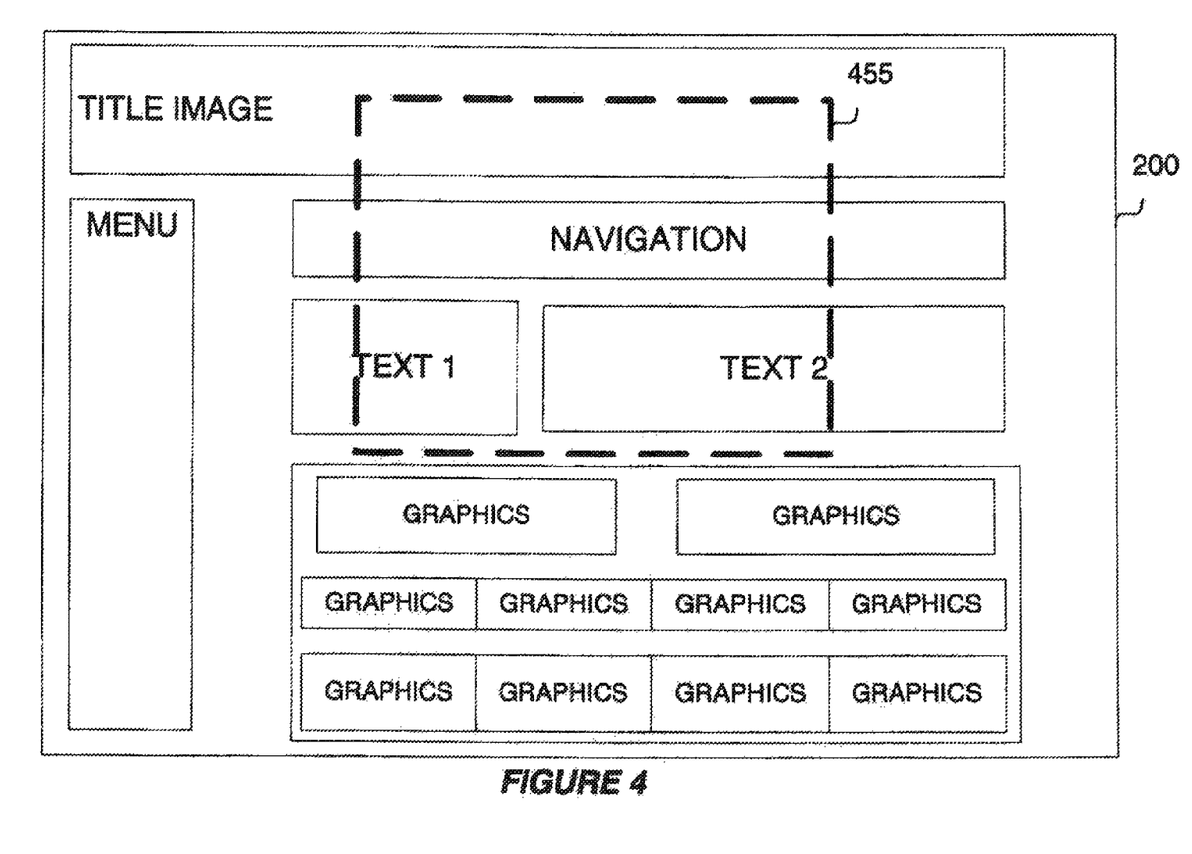
FIG. 4 also depicts the exemplary web page 200 of FIG. 2.

FIG. 4 also depicts the exemplary web page 200 of FIG. 2, in accordance with a preferred embodiment of the present invention. FIG. 4 also depicts a second location 455, as a result of a user 136 moving at least one of the two sliders visible in the web browser screen 300.

Figure 5:
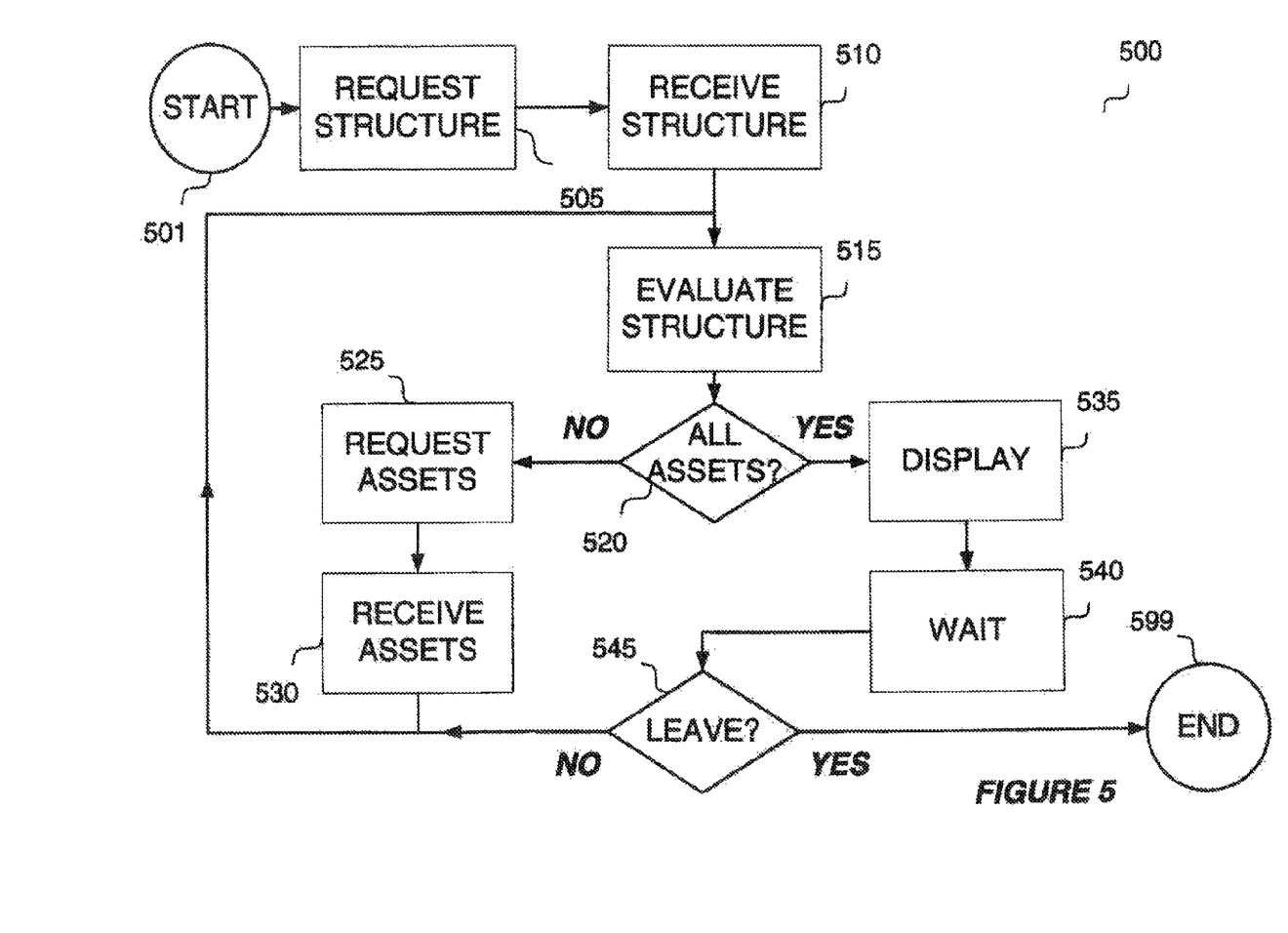
FIG. 5 is a high-level exemplary schematic flow diagram depicting typical operation method steps performed for requesting downloadable computer data elements in a data processing system, in accordance with a preferred embodiment of the present invention.
Figure 6:
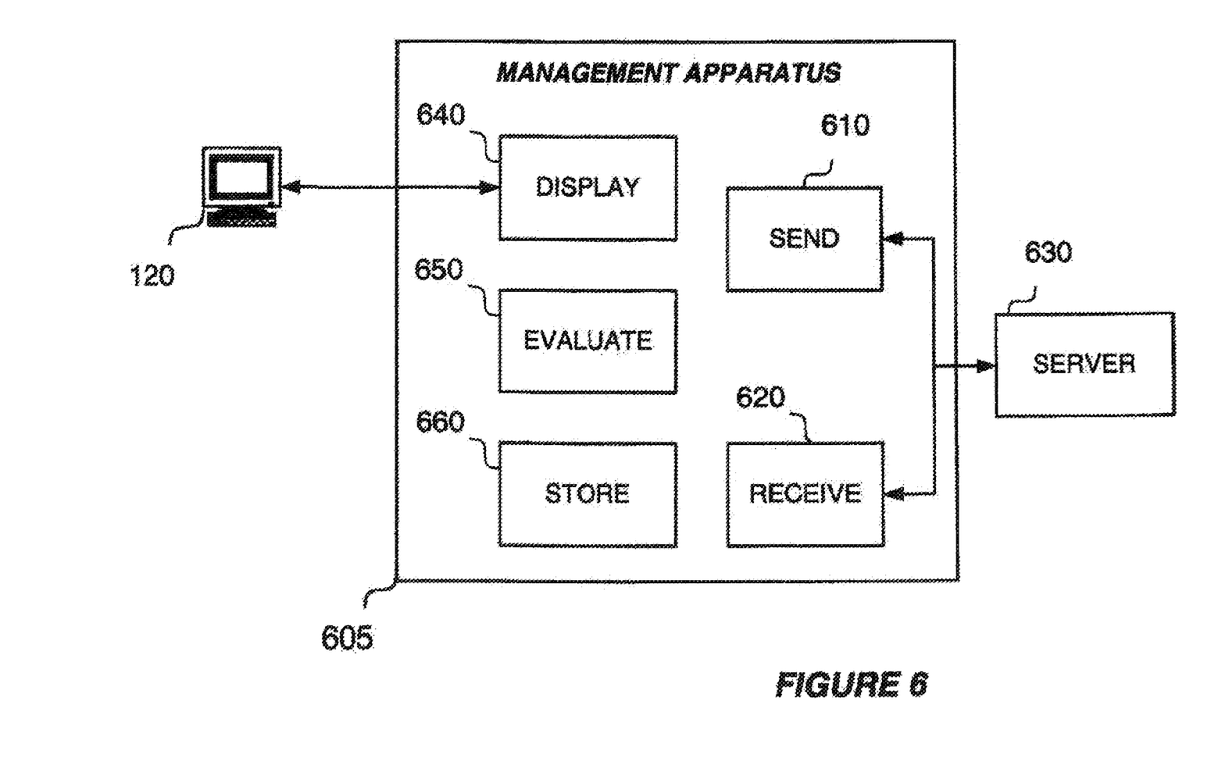
FIG. 6, is an exemplary block diagram depicting a management apparatus in which the present invention may be embodied.

FIG. 5, which should be read in conjunction with FIGS. 2, 3 and 6, is a high-level exemplary schematic flow diagram 500 depicting typical operation method steps performed for requesting downloadable computer data elements in a data processing system 100, in accordance with a preferred embodiment of the present invention. FIG. 6, is an exemplary block diagram depicting a management apparatus 605 in which the present invention may be embodied. It should be understood that the display component 640, the evaluate component 650, the store component 660, the send component 610, and the receive component 620 may each take the form of program steps encoded on the one or more memories of the client computer executed by the one or more processors of the client computer.

As an example, to illustrate the method, the structure of FIG. 2 is described, with a visible area 350 relating to the first location 250.

The method starts at step 501, when a user 136 submits a URL, having typed the URL in the address field 310 of the web browser window 300. At step 505, the send component 610 sends a request for the structure of the web page 200, as in the prior art. The send component communicates with a name server 152. The name server translates the URL into an IP address. The send component communicates with the server 150 at the IP address specified by the name server 152. The send component issues a request message to the server 150 for a structure document of the specified web page 200. Typically, the request message complies with the Hypertext Transfer Protocol (HTTP), and comprises a GET method. At step 510, a receive component 620 receives a structure document from the server 150. Typically, the structure document comprises HTML, Cascading Style Sheets (CSS), JavaScript, and pointers to a plurality of data elements. At step 515, an evaluate component 650 evaluates the structure of the web page 200 from the structure document. For illustrative purposes, the structure document may also be depicted as in FIG. 2. The evaluate component 650 also evaluates the layout of the web page 200 with respect to the display characteristics of the workstation 120, or mobile phone 130, and with respect to the dimensions of the web browser window 300 required by the user 136. From the evaluation of structure and layout of the web page 200, the evaluate component 650 determines which data elements are visible in each field 205, 210, 215, 220, 222, 225 of the web page 250. The evaluate component 650 also determines which fields 205, 210, 215, 220 are visible at the required location 250, and also which portions 305, 315, 310, 320 of the fields are visible. Therefore, in the example, the evaluate component 650 determines that data elements 205, 210, 215 and 220 are required for the first location 250.

The evaluate component 650 also determines, at step 520, whether the data elements 205, 210, 215, 220 determined for the first location 250 have already been acquired by the web browser 145. If the data elements have not all been acquired, at step 525, the send component 610 sends a request to the server 150 for unacquired data elements determined at step 515. In a preferred embodiment, the entire data element is requested, even though the entire data element may not be capable of being displayed. In an alternative embodiment, only visible portions of data elements are requested.

At step 530, the receive component 620 receives the data elements requested. The store component 660 stores the data elements in a store accessible to the web browser 145. At step 515, following the receipt of the data elements, the evaluate component 650 evaluates the structure again to allow for layout changes due to differences in actual data element size, compared to the size described by the structure document.

When there are no more unacquired data elements relating to the visible area 350, at step 535, the display component 640 displays the visible area 350 of the first location 250 in the web browser window 300. At step 540, the web browser goes into a wait state until intervention from the user 136.

At step 545, if the user 136 uses the scroll facilities 330, 340 to alter the visible area to a second location 455 of the web page 200, the evaluate component 650 re-evaluates the layout of the web page 200, at step 515, with respect to the second location 455. The method described above is repeated for all unacquired data elements. In the example, data elements have been acquired and stored for: the title image field 205; the navigation field 210; the menu field 215; and, the text field 220. Therefore, when the user 136 scrolls to second location 455, the management apparatus only requests data elements for text field 222.

In contrast at step 545, if the user 136 does not change the visible area 350, but rather exits that web page 200, the method exits at step 599. If the user 136 reads the top of the web page 200 and subsequently exits, only the used data elements are paid for without the user 136 having missed any information of value from the page.

In an alternative embodiment, data elements are requested, received, and re-evaluated one at a time. The send component 610 sends additional requests for all unacquired data elements relating to the visible area 350 for the first location 250. The layout of the page is re-evaluated after every new data element receipt.

FIG. 5 is set forth as logical flow chart diagrams. As such, the depicted order and labelled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

Figure 7:
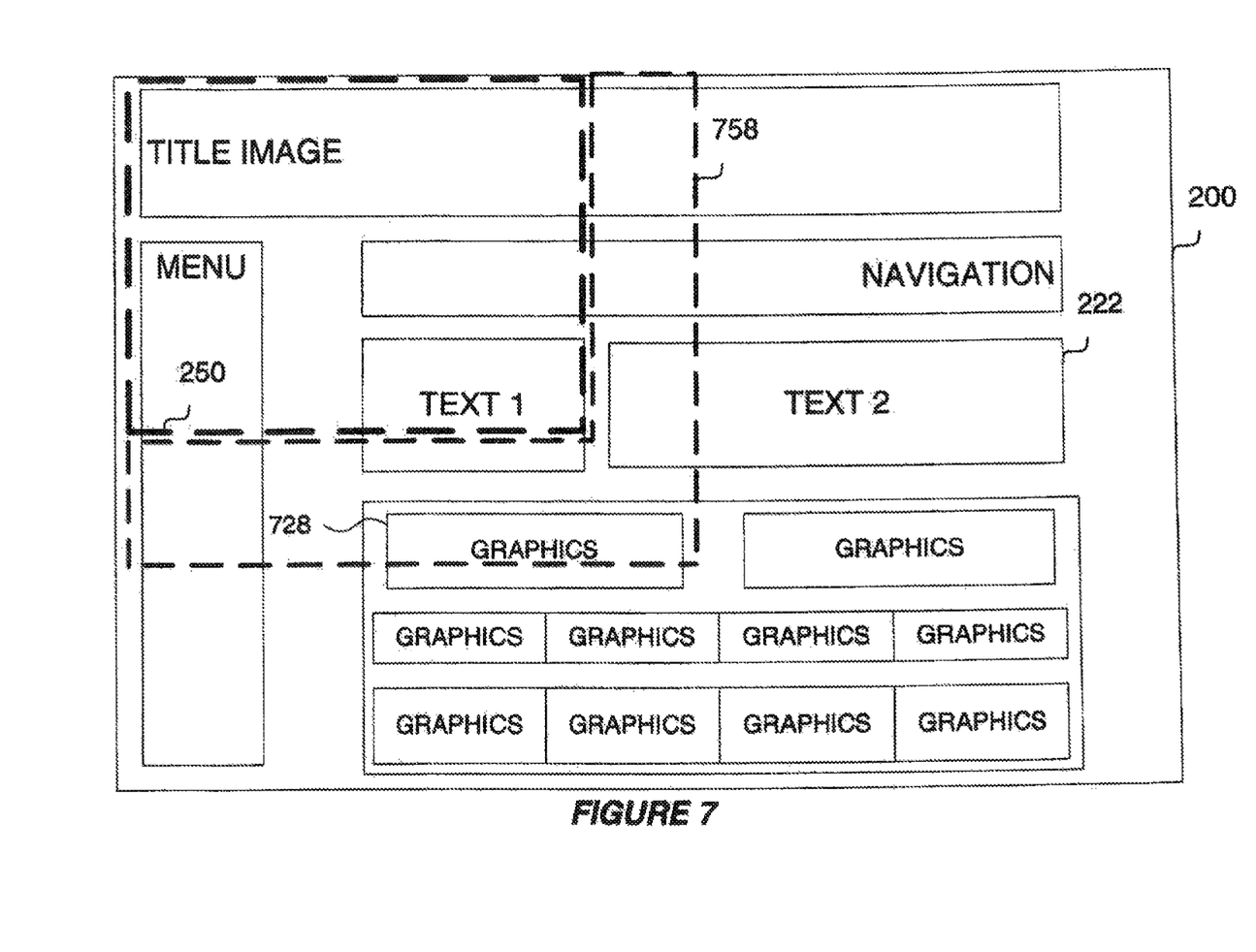
FIG. 7 also depicts the exemplary web page of FIG. 2, in accordance with a preferred embodiment of the present invention.

FIG. 7 also depicts the exemplary web page 200 of FIG. 2, in accordance with a preferred embodiment of the present invention. FIG. 7 also depicts an adjustable pre-fetch location 758, bordering the first location 250 of FIG. 2.

In an alternative embodiment, an adjustable pre-fetch area is operable around the visible area 350 of the web browser window 300. The depicted pre-fetch location 758 relates to the pre-fetch area for the first location 250. Any unacquired data elements relating to the pre-fetch area are also requested at step 525, in addition to the acquired data elements relating to the first location 250. In the example described, the management apparatus first acquires data elements 205, 210, 215 and 220 relating to the first location 250. Secondly the management apparatus requests, receives and stores unacquired data elements relating to the pre-fetch location 758. The only unacquired data elements in this example are the data elements relating to a text field 222, and a graphics field 728, as the other data elements within the scope of the first location 250, or the pre-fetch location 758, have already been acquired.

When there are no more unacquired data elements relating to the visible area 350 or the pre-fetch area, at step 535, the display component 640 displays the data elements relating to the visible area 350 of the first location 250 in the web browser window 300.

In an alternative embodiment, the client application 145 comprises an email client 145 operable on a workstation 120, 130 that interacts with a further data processing component. The further data processing component may be an email server 150, or may be another email client 145 operable on another workstation 120, 130 connectable through a P2P connection.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be appreciated that the method and arrangement described above may also suitably be performed fully or partially in software running on one or more processors (not depicted in the figures), and that the software may be provided in the form of one or more computer program elements carried on any suitable data-carrier (also not depicted in the figures) such as a magnetic or optical disk or the like.

For the avoidance of doubt, the term "comprising", as used herein throughout the description and claims is not to be construed as meaning "consisting only of".

According to one embodiment, the present invention may be realized as a computer program product comprising a computer readable, tangible storage device having encoded thereon program instructions executed by the one or processors to carry out the above described methods. As is known in the art, the storage device may be read-only memory (RAM), a hard drive, a CD, a DVD, a USB flash memory device, or any other tangible, volatile or non-volatile memory device.

The invention claimed is:

1. A computer management apparatus for displaying a data file on a client computer, wherein the client computer comprises a visible area, wherein the data file comprises a structure file and a first plurality of data elements, and wherein the first plurality of data elements comprises a second plurality of data elements, the apparatus comprising:
at least one processor in a client computer;
at least one memory operably connected to the at least one processor;
a send component encoded on the at least one memory and executable by the at least one processor to send a first message to a server, wherein the message comprises a request for a structure file, wherein the structure file comprises a list of the first plurality of data elements;
a receive component encoded on the at least one memory and executable by the at least one processor to receive the structure file from the server;
an evaluate component encoded on the at least one memory and executable by the at least one processor to determine, responsive to receipt of the structure file:
the second plurality of data elements, wherein the second plurality of data elements is associated with the visible area; and
a fourth plurality of data elements, wherein the fourth plurality of data elements is associated with a pre-fetch area, the pre-fetch area determined by the evaluate component to border the visible area;
the send component further operable to send:

a second message to the server, wherein the second message comprises a request for the second plurality of data elements; and a fourth message to the server, wherein the fourth message comprises a request for the fourth plurality of data elements;

the receive component further operable to receive the second plurality of data elements and the fourth plurality of data elements;

a store component encoded on the at least one memory and executable by the at least one processor to store, responsive to receipt of the fourth plurality of data elements, the fourth plurality of data elements in a client computer store; and a display component encoded on the at least one memory and executable by the at least one processor to display, responsive to receipt of the second plurality of data elements, the second plurality of data elements in the visible area.

2. The apparatus of claim 1, wherein the apparatus further comprises:

the store component, responsive to receipt of the second plurality of data elements, further operable to store the second plurality of data elements in a client computer store.

3. The apparatus of claim 2, wherein the second plurality of data elements comprises a third plurality of data elements, and wherein the apparatus further comprises:

the evaluate component, responsive to receipt of the structure file, further operable to evaluate the list of the first plurality of data elements for determining the third plurality of data elements, wherein the third plurality of data elements is not stored in the client computer store;

the send component further operable to send a third message to the server, wherein the third message comprises a request for the third plurality of data elements;

the receive component further operable to receive the third plurality of data elements;

the store component, responsive to receipt of the third plurality of data elements, further operable to store the third plurality of data elements in the client computer store; and the display component, responsive to receipt of the third plurality of data elements, further operable to display the second plurality of data elements in the visible area.

4. The apparatus of claim 1, wherein the client application is a web browser.

5. The apparatus of claim 1, wherein the client application is an email client.

6. A method for displaying a data file on a client computer, wherein the client computer comprises a visible area, wherein the data file comprises a structure file and a first plurality of data elements, and wherein the first plurality of data elements comprises a second plurality of data elements, the method comprising the steps of:

a client computer sending a first message to a server, wherein the message comprises a request for a structure file, wherein the structure file comprises a list of the first plurality of data elements;

the client computer receiving the structure file from the server;

responsive to receipt of the structure file, the client computer determining:

the second plurality of data elements, wherein the second plurality of data elements is associated with the visible area; and a fourth plurality of data elements, wherein the fourth plurality of data elements is associated with a pre-fetch area, the pre-fetch area determined to border the visible area;

the client computer sending:

a second message to the server, wherein the second message comprises a request for the second plurality of data elements; and a fourth message to the server, wherein the fourth message comprises a request for the fourth plurality of data elements;

the client computer receiving the second plurality of data elements and the fourth plurality of data elements;

responsive to receipt of the fourth plurality of data elements, the client computer storing the fourth plurality of data elements in the client computer store; and responsive to receipt of the second plurality of data elements, the client computer displaying the second plurality of data elements in the visible area.

7. The method of claim 6, wherein the method further comprises the steps of:

responsive to receipt of the second plurality of data elements, the client computer storing the second plurality of data elements in the client computer store.

8. The method of claim 7, wherein the second plurality of data elements comprises a third plurality of data elements, and wherein the method further comprises the steps of:

responsive to receipt of the structure file, the client computer evaluating the list of the first plurality of data elements for determining the third plurality of data elements, wherein the third plurality of data elements is not stored in the client computer store;

the client computer sending a third message to the server, wherein the third message comprises a request for the third plurality of data elements;

the client computer receiving the third plurality of data elements;

responsive to receipt of the third plurality of data elements, the client computer storing the third plurality of data elements in the client computer store; and responsive to receipt of the third plurality of data elements, the client computer displaying the second plurality of data elements in the visible area.

9. The method of claim 6, wherein the client application is a web browser.

10. The method of claim 6, wherein the client application is an email client.

11. A computer program product comprising a computer readable, tangible storage device, having encoded thereon a computer executable program of instructions, comprising:

program instructions to send a first message to a server, wherein the message comprises a request for a structure file, wherein the structure file comprises a list of the first plurality of data elements;

program instructions to receive the structure file from the server;

program instructions to determine, responsive to receipt of the structure file:

the second plurality of data elements, wherein the second plurality of data elements is associated with the visible area; and a fourth plurality of data elements, wherein the fourth plurality of data elements is associated with a pre-fetch area, the pre-fetch area determined by the evaluate component to border the visible area;

program instructions to send:

a second message to the server, wherein the second message comprises a request for the second plurality of data elements; and a fourth message to the server, wherein the fourth message comprises a request for the fourth plurality of data elements;

program instructions to receive the second plurality of data elements and the fourth plurality of data elements;

program instructions to store, responsive to receipt of the fourth plurality of data elements, the fourth plurality of data elements in a client computer store; and program instructions to display, responsive to receipt of the second plurality of data elements, the second plurality of data elements in the visible area.

12. The computer program product of claim 11, further comprising:

program instructions on the at least one memory executable by the at least one processor to store the second plurality of data elements in the client computer store in response to receipt of the second plurality of data elements.

13. The computer program product of claim 12, wherein the second plurality of data elements comprises a third plurality of data elements, and wherein the computer program product further comprises:

program instructions on the at least one memory executable by the at least one processor to evaluate the list of the first plurality of data elements for determining the third plurality of data elements in response to receipt of the structure file, wherein the third plurality of data elements is not stored in the client computer store;

program instructions on the at least one memory executable by the at least one processor to send a third message to the server, wherein the third message comprises a request for the third plurality of data elements;

program instructions on the at least one memory executable by the at least one processor to receive the third plurality of data elements;

program instructions on the at least one memory executable by the at least one processor to store the third plurality of data elements in the client computer store in response to receipt of the third plurality of data elements; and program instructions on the at least one memory executable by the at least one processor to display the second plurality of data elements in the visible area in response to receipt of the third plurality of data elements.

14. The computer program product of claim 11, wherein the client application is a web browser.

15. The computer program product of claim 11, wherein the client application is an email client.

16. The computer program product of claim 11, wherein the pre-fetch area is adjustable.

17. The computer program product of claim 1, wherein the pre-fetch area is adjustable.

18. The computer program product of claim 6, wherein the pre-fetch area is adjustable.

* * * * *